United States Patent
Ghyme et al.

(10) Patent No.: US 9,324,186 B2
(45) Date of Patent: Apr. 26, 2016

(54) METHOD FOR REPRESENTING TERRAIN, METHOD FOR CREATING TERRAIN PRIMITIVES, AND APPARATUS USING THE METHODS

(71) Applicant: Electronics and Telecommunications Research Institute, Daejeon (KR)

(72) Inventors: Sang Won Ghyme, Daejeon (KR); Sang Hyun Joo, Daejeon (KR); Il Kwon Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 265 days.

(21) Appl. No.: 13/962,355

(22) Filed: Aug. 8, 2013

(65) Prior Publication Data
US 2014/0333616 A1   Nov. 13, 2014

(30) Foreign Application Priority Data
May 13, 2013   (KR) .......................... 10-2013-0053631

(51) Int. Cl.
G06T 17/00   (2006.01)
G06T 17/05   (2011.01)
G06T 17/20   (2006.01)

(52) U.S. Cl.
CPC ................. *G06T 17/05* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 6,229,546 B1 | 5/2001 | Lancaster et al. | |
| 2006/0017938 A1* | 1/2006 | Ohtomo et al. | 356/611 |
| 2008/0246758 A1 | 10/2008 | Strassenburg-Kleciak et al. | |
| 2011/0148866 A1* | 6/2011 | Chu et al. | 345/419 |
| 2013/0034276 A1* | 2/2013 | Hibbard | 382/128 |

FOREIGN PATENT DOCUMENTS

| | | |
|---|---|---|
| KR | 10-2008-0050310 A | 6/2008 |
| KR | 10-2010-0060194 A | 6/2010 |
| KR | 10-2012-0112999 A | 10/2012 |

OTHER PUBLICATIONS

Zhou, et al. "Terrain synthesis from digital elevation models." Preparing Articles for the IEEE Transactions on Visualization and Computer Graphics (14 pages, in English), Aug. 2007.
Gain, et al. "Terrain sketching." Proceedings of the 2009 symposium on Interactive 3D graphics and games. ACM, 2009: 31-38.

* cited by examiner

*Primary Examiner* — Andrew G Yang
(74) *Attorney, Agent, or Firm* — NSIP Law

(57) ABSTRACT

A method for representing a terrain, a method for creating terrain primitives, and an apparatus using the methods are disclosed. The terrain representation method includes: reading digital elevation model (DEM) data of a terrain; extracting feature points of the terrain from the DEM data of the terrain; creating a plurality of terrain primitives according to the feature points of the terrain; storing terrain representation model data based on the plurality of terrain primitives; and converting the terrain primitive based terrain representation model data into DEM data, and visualizing the DEM data.

14 Claims, 5 Drawing Sheets

METHOD FOR REPRESENTING TERRAIN, METHOD FOR CREATING TERRAIN PRIMITIVES, AND APPARATUS USING THE METHODS

CROSS REFERENCE TO RELATED APPLICATION

This application claims priority to Korean Patent Application No. 2013-0053631 filed on May 13, 2013 in the Korean Intellectual Property Office (KIPO), the entire contents of which are hereby incorporated by reference.

BACKGROUND

1. Field

Example embodiments of the present invention relate in general to terrain representation, and more specifically, to a method for representing a terrain based on terrain primitives, a method for creating terrain primitives, and an apparatus using the methods.

2. Description of Related Art

Lately, creation of a large-scale realistic terrain is required in various fields of content, such as movies, games, and the like. In order to obtain terrain data for creating a large-scale realistic terrain, various methods have been used.

A simplest method is to enable a user to generate a terrain by himself/herself by controlling the height of a terrain using a terrain brush. However, the method is costly and takes a long time since a user should generate a terrain manually. In order to generate a realistic, high-quality terrain while minimizing a time and cost for generating a terrain, methods of automatically generating a terrain using a computer have been proposed.

One of the proposed methods is procedural terrain generation. The procedural terrain generation is a technique of repeatedly applying a predetermined rule or method to generate a complex terrain. As examples of the procedural terrain generation, there are a Perlin noise method, a fractal noise method, etc.

The Perlin noise method, which is a representative noise-based terrain modeling method, involves generating a terrain using Perlin noise. In detail, the Perlin noise method includes generating random numbers through a noise function, and applying the random numbers to a height map to thereby generate a terrain. The random numbers can generate new wavelengths by amplitudes and frequencies so that various shapes of terrains can be represented by a combination of wavelengths.

Meanwhile, the fractal noise method involves generating a terrain using fractal noise. A representative terrain modeling method using fractal noise is a midpoint displacement method, and the midpoint displacement method is based on a diamond-square algorithm. According to the diamond-square algorithm, a center point is calculated using four corner points, and a middle point is calculated using the center point and the corner points.

The procedural terrain generation can easily generate a terrain using a minimum rule, but has difficulties in generating a user's desired shape of a terrain.

In order to overcome the disadvantage of the procedural terrain generation, a sketch-based terrain generation method of building a user's desired land-form through a rough sketch by the user, and enhancing regional reality of a terrain through a procedural method and an erosion/weathering simulation technique has been proposed. The sketch-based terrain generation method helps build a land-form through sketch lines but has limitations in representing a regional concave-convex structure.

As an automated terrain generation method other than the procedural terrain generation, there is a technique based on a digital elevation model (DEM). The DEM is image data extracted from contours, aerophotos, satellite images, and the like, and represents a height of a given area. The DEM is realistic since it is built by extracting a real terrain. However, it is nearly impossible to obtain a DEM that exactly represents an imaginary terrain intended by a user.

In order to overcome the disadvantages of the terrain generation methods as described above, a combination of the terrain generation methods has been proposed. For example, there is a method of easily creating a realistic shape of a terrain intended by a user by extracting features of ridges or valleys from a DEM, splitting a terrain into terrain patches based on the features to rearrange the terrain patches according to ridges or gorges intended by the user, and smoothly synthesizing the terrain patches.

However, this method cannot ensure realistic representation of the automatically synthesized terrain either.

SUMMARY

Accordingly, example embodiments of the present invention are provided to substantially obviate one or more problems due to limitations and disadvantages of the related art.

Example embodiments of the present invention provide a method for representing a terrain based on terrain primitives, which allows a user to easily modify a terrain into a desired shape while maintaining reality of information about a real terrain to satisfy main demands from terrain makers.

Example embodiments of the present invention also provide a method for creating terrain primitives.

Example embodiments of the present invention also provide a terrain representation apparatus using the methods.

In some example embodiments, a terrain representation method includes: reading digital elevation model (DEM) data of a terrain; extracting feature points of the terrain from the DEM data of the terrain; creating a plurality of terrain primitives according to the feature points of the terrain; storing terrain representation model data based on the plurality of terrain primitives; and converting the terrain primitive based terrain representation model data into DEM data, and visualizing the DEM data.

The extracting of the feature points of the terrain from the DEM data of the terrain may include: extracting, from the DEM data, a plurality of grid points whose height values are greater or smaller by a predetermined threshold value or more than height values of adjacent grid points in a predetermined distance range in left and right directions from an arbitrary grid point; connecting the extracted grid points to grid points immediately adjacent to the extracted grid points, thereby forming edges of a mesh to construct the mesh; and extracting at least one terrain feature point from ridge or valley terrain feature lines of the mesh.

The extracting of the at least one terrain feature point from the ridge or valley terrain feature lines of the mesh may include calculating the ridge or valley terrain feature lines of the mesh according to a profile recognition and polygon breaking algorithm (PPA) or a polygon skeleton algorithm.

Each terrain primitive may be defined as a curved surface that is represented by a radial basis function whose vertex is the corresponding terrain feature point.

Each terrain primitive may be additionally defined by at least one of a gradient of a medial axis, a height, a diameter of a base, and a shape of the corresponding curved surface.

Each terrain primitive may have a concave or convex shape according to a ridge or valley feature of the corresponding terrain.

Each terrain primitive may be additionally defined by a terrain feature point corresponding to a vertex, and connection information for connecting the terrain feature point to another terrain feature point which is adjacent and connected to the terrain feature point.

The creating of the plurality of terrain primitives according to the feature points of the terrain may include calculating each terrain primitive such that a difference between a height value of a grid point adjacent to each feature point of the terrain and a height value of a curved surface of the corresponding terrain primitive is minimized.

The calculating of the terrain primitives may include calculating rates of change in height values of left and right grid points positioned in a normal direction to edges between terrain feature points which are adjacent and connected to the feature point of the terrain; and using the rates of change in the height values to minimize the difference between the height value of the adjacent grid point and the height value of the curved surface of the corresponding terrain primitive.

The converting of the terrain primitive based terrain representation model data into the DEM data and the visualizing of the DEM data may include, designating height values of the remaining grid points excluding the feature points of the terrain using maximum and minimum values among height values of the corresponding grid points calculated based on terrain primitives including the corresponding grid points, and thereby converting the terrain primitive based terrain representation model data into the DEM data.

The DEM data may include height coordinates that represent a height value of each grid point representing a terrain.

The feature points of the terrain may include at least one feature point representing a ridge or a valley.

In other example embodiments, a terrain representation apparatus includes: a DEM reader reading DEM data of a terrain; a terrain feature extracting unit extracting feature points of the terrain from the DEM data of the terrain, the feature points representing a ridge or a valley; a terrain primitive creating unit creating a plurality of terrain primitives according to the feature points of the terrain; a terrain model data storage unit storing the plurality of terrain primitives as terrain model data based on terrain primitives; a terrain editing unit editing and storing the terrain primitives from the terrain model data based on terrain primitives; and a terrain visualizing unit converting the terrain model data based on terrain primitives into DEM data, and visualizing the DEM data.

According to the embodiments of the present invention as described above, it is possible to improve the quality of a terrain by allowing a user to easily modify a real terrain into a desired shape.

Also, a user can easily generate and edit a terrain by using terrain primitives that can be easily rendered, and also can use an existing DEM by converting the DEM into a plurality of terrain primitives.

Furthermore, since a data size needed to represent the plurality of terrain primitives is significantly smaller than a data size of the DEM, an effect of reducing a data size needed to visualize a large-scale terrain may be obtained, and different resolutions of terrain data may be generated upon conversion into terrain data.

BRIEF DESCRIPTION OF THE DRAWINGS

Example embodiments of the present invention will become more apparent by describing in detail example embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Also, terms, which will be described later, are defined by considering the functions of the present invention and may vary according to clients, operators, users' purposes, or usual practices. Therefore, definitions of terms should be based on the overall contents of the present specification.

Hereinafter, embodiments of the present invention will be described in detail with reference to the appended drawings. In the following description, for easy understanding, like numbers refer to like elements throughout the description of the figures, and the same elements will not be described further.

Prior to describing a method of representing a terrain based on terrain primitives according to an embodiment of the present invention in detail, the concept of a terrain will be described below as it applies to the present invention.

Among methods of representing a terrain, there is a digital elevation model (DEM). The DEM involves dividing a rectangular area into matrices and representing height values at individual grid points. DEM data represents the number of grid points in the rectangular area as a size, and represents an actual distance between points as a resolution.

Also, there is a geographic Tag Image File Format (Geo-TIFF) method which is a graphic file format in which geographic information is stored in the form of a tag in a satellite image. The GeoTIFF method is basically the same as the DEM since only a height value at each point of a DEM is substituted with a gray color value of an image pixel in the GeoTIFF method.

In order to represent a terrain, different resolutions of DEM data may be needed. In the case of visualizing the overall terrain of the earth at a high height, DEM data with a low resolution for each region may be appropriately used. However, in the case of enlarging and visualizing a specific region at a low height, DEM data with a high resolution for the corresponding region is needed.

Meanwhile, in the present invention, it is assumed that a predetermined rule is applied to the height values of DEM data created from a real terrain even though they are irregularly distributed.

In detail, it is assumed that all terrains that are shown in irregular shapes can be represented as a combination of simple terrains having a bell shape. In the present disclosure, such a simple terrain having a bell shape is referred to as a terrain primitive.

That is, in the present invention, it is assumed that all terrains that are shown in irregular shapes can be represented by mixing terrain primitives having various sizes. This assumption is based on a determination that although a certain terrain has an unspecific shape as a whole, the local regions of the terrain can be observed as two types of concave terrains and convex terrains.

Figure 1:
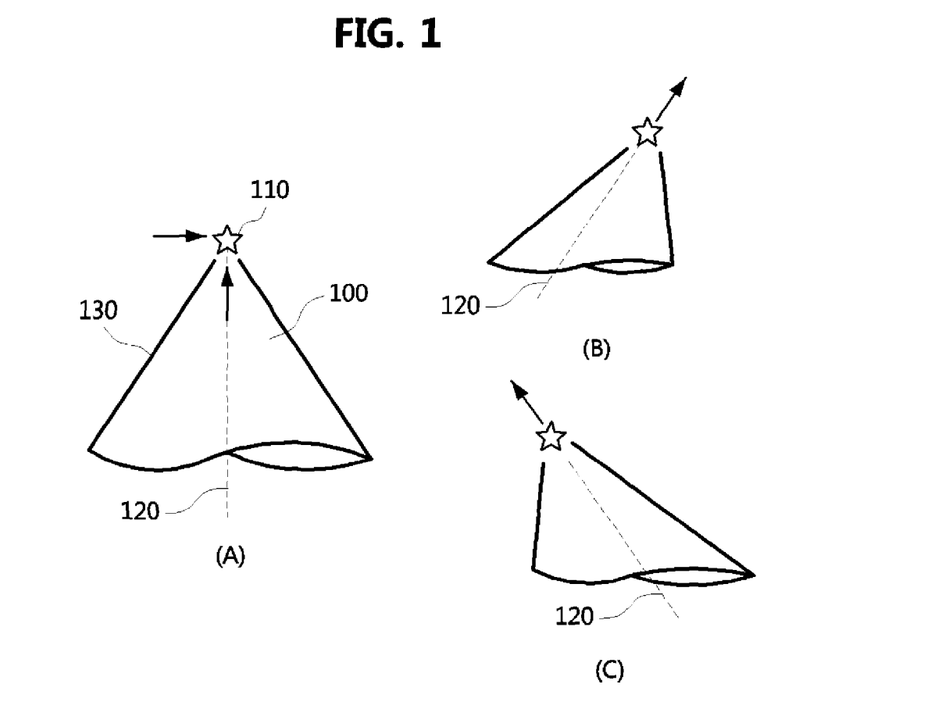
FIG. 1 illustrates terrain primitives according to an embodiment of the present invention in order to describe a terrain representation method according to an embodiment of the present invention.

FIG. 1 illustrates terrain primitives according to an embodiment of the present invention in order to describe a terrain representation method according to an embodiment of the present invention.

The shape of each terrain primitive 100 illustrated in FIG. 1 is defined by 5 parameters or more. Also, a plurality of terrain primitives are connected to each other by at least one parameter.

The terrain primitive 100 may be represented as a mathematical structure having one of various shapes. The terrain primitive 100 may be in the shape of a cone or bell suitable for representing a terrain.

Accordingly, as illustrated in FIG. 1, the shape of the terrain primitive 100 is defined by a vertex 110, a medial axis 120, and a rate of change 130 in a gradient of a curved surface extending from the vertex 110 to a base.

The vertex 110 of the terrain primitive 100 has a location value. The location value of the vertex 110 of the terrain primitive 100 may be expressed as 3-dimensional (3D) coordinates of (x, y, z), and is representative of a height value of the terrain primitive 100.

The medial axis 120 of the terrain primitive 100 may have axis gradient values. The axis gradient values may be two parameters representing a tilting direction $\phi$ and a tilting degree $\psi$.

In the case of an example (a) of FIG. 1, a terrain primitive 100 has a tilting direction $\phi$ of 0 and a tilting degree $\psi$ of 0 since the terrain primitive 100 has a symmetric structure with respect to a vertex, whereas in the case of examples (b) and (c) of FIG. 1, the tilting directions $\phi$ and tilting degrees $\psi$ of terrain primitives 100 are not zero. Such axis gradient values are useful in representing different rates of change in a gradient in the left and right directions with respect to the vertex of a terrain primitive. For example, axis gradient values may be usefully in representing a terrain whose one side has a steep slope but whose opposite side has a gradual slope.

A terrain primitive 100 basically maintains the same rate of change in a gradient in all directions with respect to its vertex. However, if gradient values of a medial axis 120, that is, a tilting direction $\phi$ and a tilting degree $\psi$ of the medial axis 120, are given, a curved surface may be represented by designating a different rate of change in a gradient by the tilting degree $\psi$ with respect of the opposite direction $-\phi$ of the tilting direction $\phi$.

Figure 2:
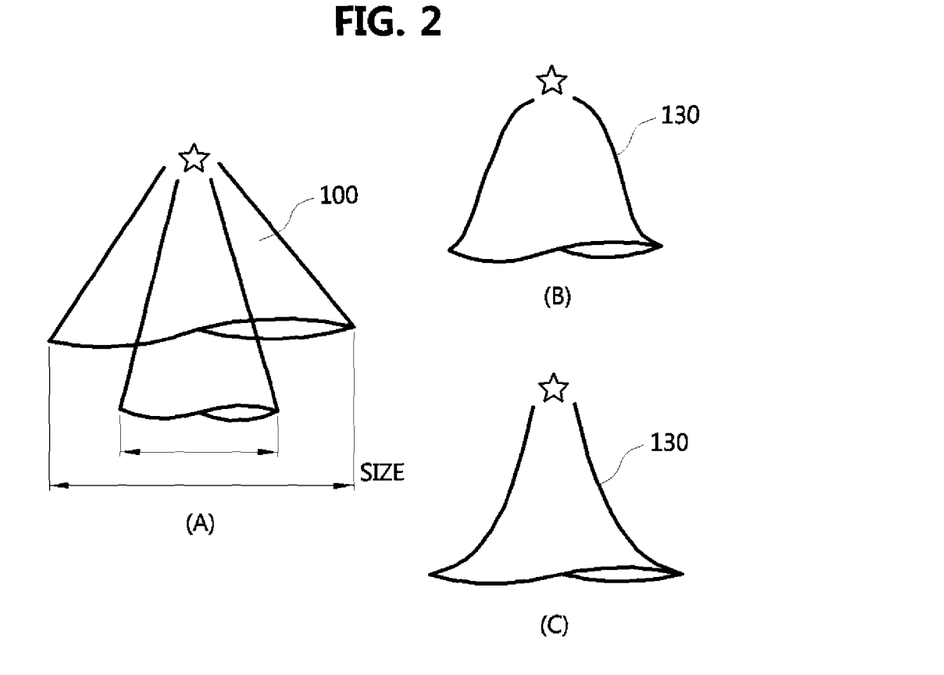
FIG. 2 illustrates terrain primitives according to another embodiment of the present invention in order to describe a terrain representation method according to another embodiment of the present invention.

FIG. 2 illustrates terrain primitives according to another embodiment of the present invention in order to describe a terrain representation method according to another embodiment of the present invention.

Referring to FIG. 2, a terrain primitive 100 has a height value and a width value. The height value does not mean an altitude value, but is a difference between a maximum altitude value corresponding to a vertex of the terrain primitive 100 and a minimum altitude value corresponding to a base of the terrain primitive 100. The width value is the diameter of the base of the terrain primitive 100.

If the terrain primitive 100 has a great height value and a small width value, the terrain primitive 100 may represent a sharp terrain, and if the terrain primitive 100 has a very small height value and a very great width value, the terrain primitive 100 can represent a flat terrain.

The terrain primitive 100 also has a rate of change 130 in a gradient of a curved surface. As illustrated in FIG. 2, by adjusting a rate of change 130 in a gradient, various shapes of curved surfaces may be represented.

In order to control a rate of change 130 in a gradient of the terrain primitive 100, various radial basis functions (RBFs) may be used, and the RBFs include a cubic spline function, a gain function, etc.

The cubic spline function may be expressed as Equation (1), below.

$$\phi(r)=ar^3+br^2+cr+d, r=\|x-x_i\| \qquad (1)$$

By adjusting parameters a, b, c, and d of a cubic spline curve with respect to a vertex $x_i$ in Equation (1), a rate of change in a gradient may be controlled.

Meanwhile, the gain function according to another method of defining a curved surface may be expressed as Equation (2), below.

$$\phi(r) = \begin{bmatrix} \left\{ \begin{array}{l} \frac{(2r)^{\frac{\log(1-g)}{\log(0.5)}}}{2}, r \geq 0.5 \\ 1 - \frac{(2-2r)^{\frac{\log(1-g)}{\log(0.5)}}}{2}, r < 0.5 \end{array} \right\}, g \geq 0.5 \\ \left\{ 1 - \frac{(2-2r)^{\frac{\log(1-g)}{\log(0.5)}}}{2} \right\}, g < 0.5 \end{bmatrix}, r = \|x - x_i\| \quad (2)$$

In a gain function curve expressed by Equation (2), a rate of change in a gradient may be controlled by adjusting a gain value g in a section of [0, 1]. If the gain value g is set to 0.5, the terrain primitive 100 is represented in the shape of a cone as illustrated in (a) of FIG. 2, if the gain value g is set to be greater than 0.5, the terrain primitive 100 is represented in the shape of a bell as illustrated in (b) of FIG. 2, and if the gain value g is set to be smaller than 0.5, the terrain primitive 100 is represented in a sharp shape as illustrated in (c) of FIG. 2.

Figure 3:
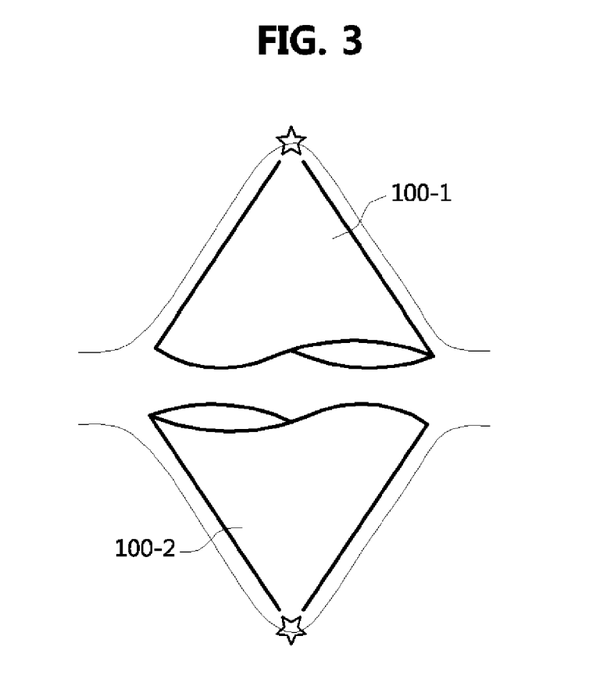
FIG. 3 illustrates terrain primitives according to still another embodiment of the present invention in order to describe a terrain representation method according to still another embodiment of the present invention.

FIG. 3 illustrates terrain primitives according to still another embodiment of the present invention in order to describe a terrain representation method according to still another embodiment of the present invention.

Referring to FIG. 3, terrain primitives may be classified into two types. One of the two types is a terrain primitive 100-1 which is in a convex shape capable of representing a peak terrain, and the other one is a terrain primitive 100-2 which is in a concave shape capable of representing a concave terrain such as a valley.

Final terrain data created based on a plurality of terrain primitives according to the present invention may be represented with maximum values of height values of a plurality of convex terrain primitives and minimum values of height values of a plurality of concave terrain primitives.

Figure 4:
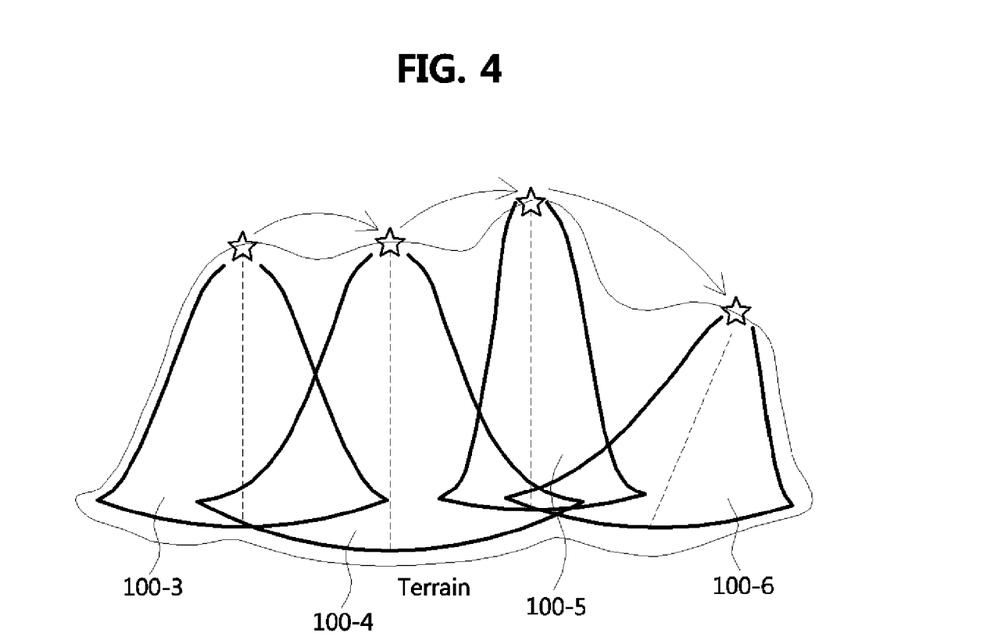
FIG. 4 is a conceptual view for describing a terrain representation method based on terrain primitives according to an embodiment of the present invention.

FIG. 4 is a conceptual view for describing a terrain representation method based on terrain primitives according to an embodiment of the present invention.

FIG. 4 conceptually illustrates a method of representing a terrain by connecting a plurality of terrain primitives defined according to the embodiments of the present invention as described above with reference to FIGS. 1, 2, and 3.

As illustrated in FIG. 4, a plurality of terrain primitives may be sequentially connected to each other, wherein each terrain primitive has a pointer indicating another terrain primitive that is to connect to it.

As illustrated in FIG. 4, since the sequentially connected terrain primitives 100-3, 100-4, 100-5, and 100-6 have similar shapes, sharing parameters between associated terrain primitives is meaningful, and may be used to optimize terrain primitives.

As such, by connecting the plurality of terrain primitives 100-3, 100-4, 100-5, and 100-6 each defined by a location value of a vertex, gradient values of a medial axis, a size value of a base, a rate of change in a gradient of a curved surface, and a terrain primitive type, a terrain including the terrain primitives 100-3, 100-4, 100-5, and 100-6 may be constituted.

As another method of representing a terrain primitive, a Gaussian RBF may be expressed as Equation (3), below.

$$\phi(x; \mu, \sigma) = \frac{1}{\sqrt{2\pi}\,\sigma} e^{-\frac{1}{2\sigma^2}(x-\mu)^2} \quad (3)$$

As seen from Equation (3), a terrain primitive is defined by two or more parameters of a center location μ and a standard deviation σ defining the size and shape of the terrain primitive.

Also, terrain data proposed in the present invention may be represented as a sum of a plurality of Gaussian terrain primitives.

$$y(x) = \sum_{i=1}^{N} \omega_i \phi_i(x) \quad (4)$$

As seen in Equation (4), a terrain height value y at a specific point is defined by a sum of a plurality of Gaussian terrain primitives having weights of $\omega_i$.

Creation of terrain data proposed in the present invention may be substituted with a Gaussian mixture model using Equations (3) and (4). In other words, terrain data having terrain height values at grid points may be converted into a list of Gaussian terrain primitives each having parameters of a center location μ and a standard deviation σ.

In detail, weights and parameters of Gaussian terrain primitives may be decided by an expectation-maximization (EM) algorithm. Also, Gaussian mixture learning may be used to constitute optimized Gaussian terrain primitives that can appropriately represent terrain data within a limited error range.

Thereby, it is possible to easily generate a terrain with a higher resolution than original DEM data using a sufficient number of Gaussian terrain primitives, or a terrain with a lower resolution than original DEM data using a minimum number of Gaussian terrain primitives.

Also, since data constituted with optimized Gaussian terrain primitives may be stored with a significantly smaller size than original DEM data, the data constituted with optimized Gaussian terrain primitives may be used to store terrain information with a smaller size in a web map, a navigation system, and the like.

Figure 5:
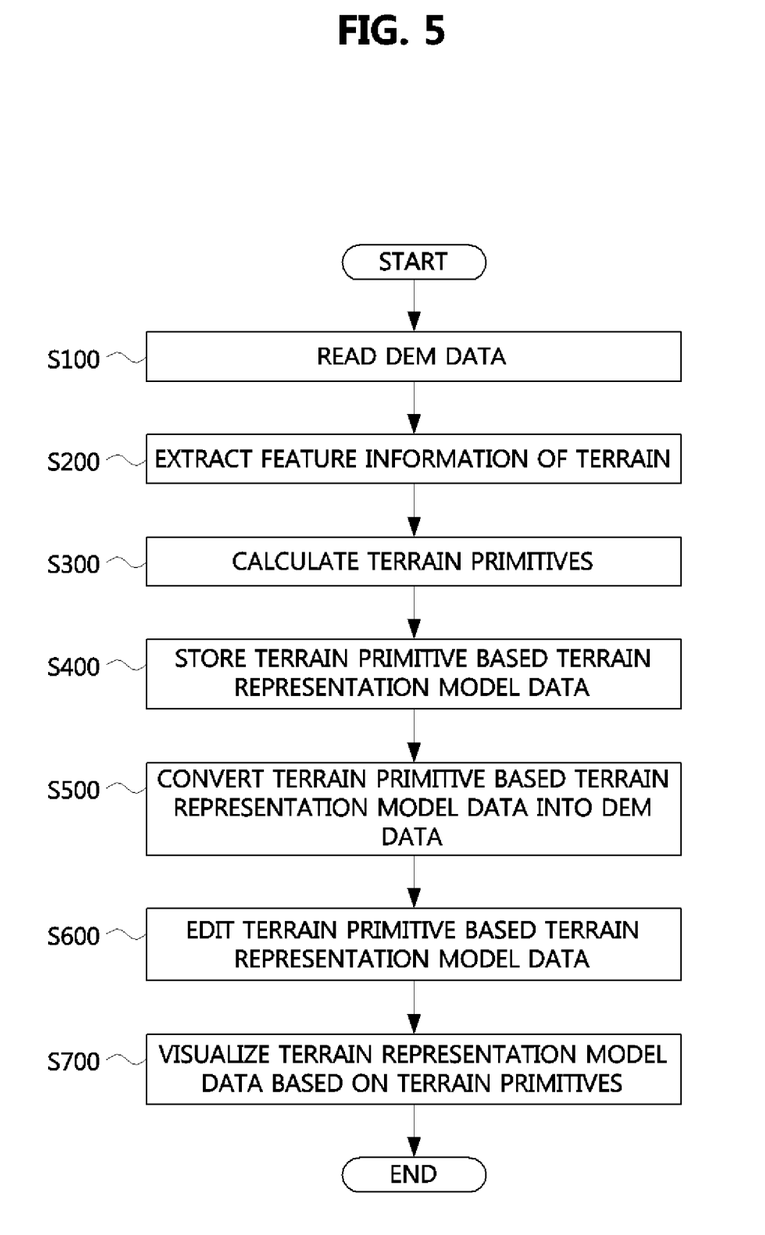
FIG. 5 is a flowchart illustrating the terrain representation method based on the terrain primitives according to the embodiment of the present invention.

FIG. 5 is a flowchart illustrating the terrain representation method based on the terrain primitives, according to the embodiment of the present invention.

In the following description, individual operations of the terrain representation method based on the terrain primitives according to the embodiment of the present invention can be understood as functions that are performed by the corresponding components of a terrain representation apparatus which will be described later with reference to FIG. 7, however, the individual operations of the terrain representation method should be limited to functions defining the operations. That is, each operation is not limited by the name of an exemplary component that performs the operation.

Referring to FIG. 5, DEM data created based on contours, aerophotos, satellite images, and the like is read and loaded (S100).

Then, the loaded DEM data is analyzed to extract features of a terrain from the DEM data (S200). Operation S200 of extracting the features of the terrain from the DEM data may include: extracting, from the DEM data, a plurality of grid points whose height values are greater or smaller by a predetermined threshold value or more than those of adjacent grid points in a predetermined distance range in the left and right directions from an arbitrary grid point; connecting the extracted grid points to grid points immediately adjacent to the extracted grid points, thereby forming edges of a mesh to construct the mesh; and extracting at least one feature point from ridge or valley terrain feature lines of the mesh.

Here, a method for extracting at least one feature point from ridge or valley terrain feature lines of the mesh may be a profile recognition and polygon breaking algorithm (PPA) or a polygon skeleton algorithm. The PPA extracts representative features by detecting all concave-convex features of a terrain through profile recognition and removing insignificant features through polygon breaking.

The PPA is used to detect features in units of points from a terrain and calculate a degree of representativeness at each feature point. Feature points with high degrees of representativeness are connected to each other to thereby extract a feature curve representing a median axis.

Thereafter, the features of the terrain, extracted in operation S200, are analyzed to create terrain primitives (S300).

Operation S300 of creating the terrain primitives may include: determining an order in which terrain primitives are created according to terrain regions often appearing in the corresponding terrain; setting each terrain feature point to a vertex; calculating a shape of a terrain primitive most similar to a concave/convex terrain based on the vertex; setting a region of the corresponding concave/convex terrain in consideration of a relationship with other concave/convex terrain regions; deciding a magnitude value of the terrain primitive based on the radius of the region of the concave/convex terrain; calculating gradient values of a medial axis of the terrain primitive; deciding values of change in a gradient of the terrain primitive; and generating associated terrain primitives.

Operation S300 of creating the terrain primitives will be described in more detail with reference to FIG. 6, later.

The created terrain primitive information is stored in the format of a data file (S400). The terrain primitive information is referred to as terrain primitive based terrain representation model data.

According to the terrain representation method, the terrain primitive based terrain representation model data created by the above-described method is converted into DEM data for existing systems using DEM data (S500).

At this time, different types of DEM data may be created according to resolutions given from the terrain primitive based terrain representation model data. If the terrain primitive based terrain representation model data has a low resolution (that is, if the distances between grid points are long), terrain primitives having low degrees of representativeness may be simplified and not represented.

After the terrain primitive based terrain representation model data is converted into DEM data, the terrain primitive based terrain representation model data is edited (S600).

At this time, the terrain primitives may be edited independently. However, independently editing terrain primitives may bring about unintended results. For example, there is a case in which several concave and convex regions exist in a large mountain. In this case, if a terrain primitive having a high degree of representativeness, which represents the large mountain, is converted into a larger scale primitive, terrain primitives that exist locally and have low degrees of representativeness are buried so that local features disappear.

In the current embodiment, for effective editing, adjacent terrain primitives are internally associated with each other. Thereby, when a terrain primitive having a high degree of representativeness is modified, sub terrain primitives existing in the same region as the terrain primitive are modified accordingly.

Terrain primitives connected to each other may be represented as a feature curve, and the feature curve may be edited by a user's sketch.

After the terrain primitive based terrain representation model data is completely edited, the terrain primitive based terrain representation model data is visualized (S700).

In order to visualize the terrain primitive based terrain representation model data, the terrain primitive based terrain representation model data may be converted into image data or 3D mesh data. At this time, instead of directly converting the terrain primitive based terrain representation model data into image data or 3D mesh data, the terrain primitive based terrain representation model data may be converted into DEM data according to a given resolution, and then the DEM data may be converted into image data or 3D mesh data.

Figure 6:
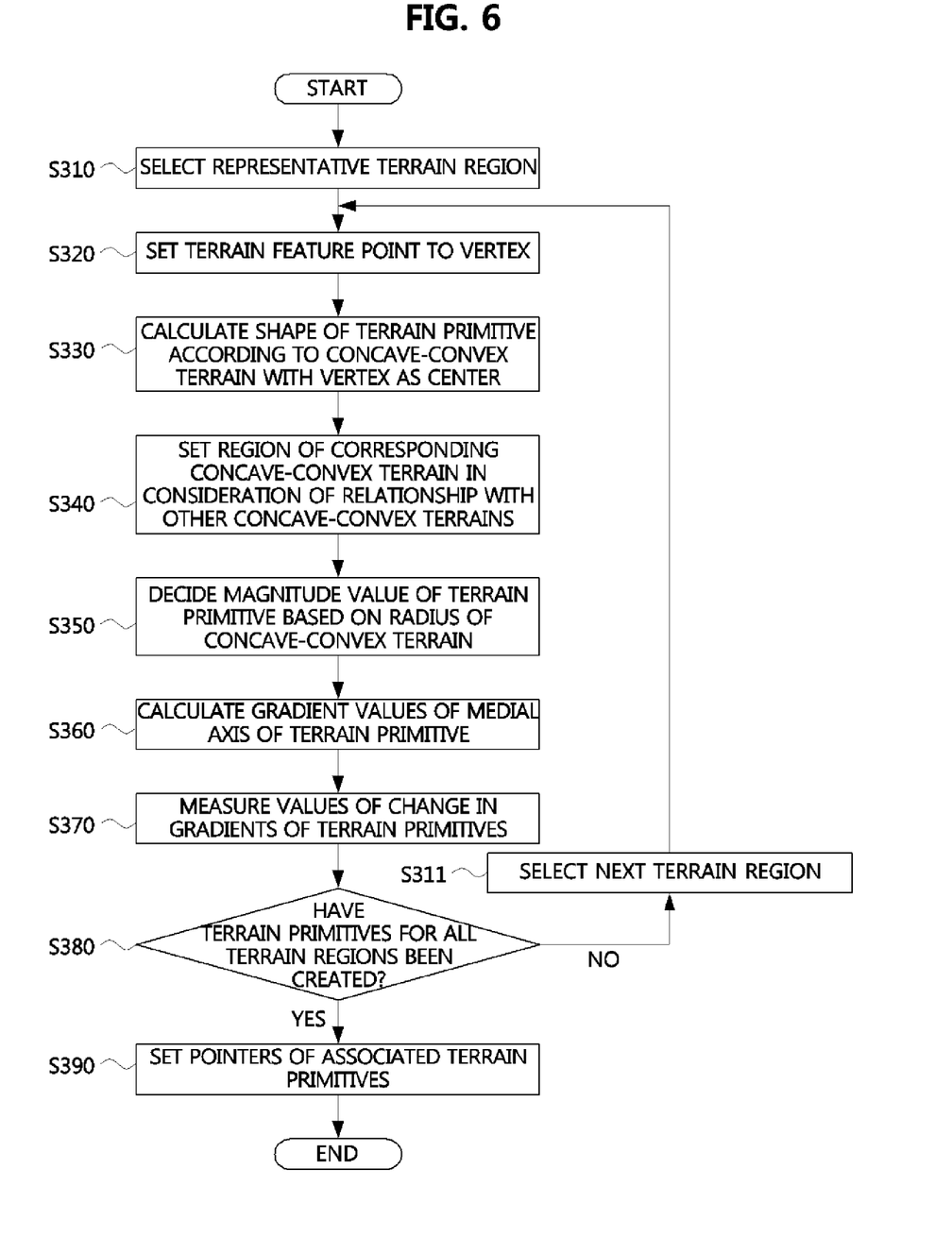
FIG. 6 is a flowchart illustrating a method of creating terrain primitives according to an embodiment of the present invention.

FIG. 6 is a flowchart illustrating a method of creating terrain primitives according to an embodiment of the present invention.

In the method of creating terrain primitives as illustrated in FIG. 6, operation S300 of creating terrain primitives in the terrain representation method as described above with reference to FIG. 5 will be described in more detail.

As described above with reference to FIG. 5, in the following description, individual operations of the terrain representation method based on the terrain primitives according to the embodiment of the present invention can be understood as functions that are performed by the corresponding components of a terrain representation apparatus which will be described later with reference to FIG. 7, however, the individual operations of the terrain representation method should be limited to functions defining the operations. That is, each operation is not limited by the name of an exemplary component that performs the operation.

According to the method of creating terrain primitives as illustrated in FIG. 6, terrain primitives corresponding to concave and convex terrain features are created in order from a high degree of representativeness to a low degree of representativeness.

First, a representative terrain region of a terrain is selected (S310). Terrain regions are regional units that are distinguished according to concave and convex terrain features.

In a real earth terrain, a main part of a plain region is flat. Accordingly, the representative terrain region may be a flat region in which few altitude differences appear.

However, since the altitudes of flat regions vary in different localities, the altitudes of flat regions cannot be designated as the same value. Accordingly, by creating a terrain primitive representing a flat region and setting a size value of the base of the created terrain primitive to be infinite, the flat region may be represented.

Then, a terrain feature point is set to a vertex of the terrain primitive (S320). A shape (that is, a type) of a terrain primitive most similar to a concave/convex terrain based on the vertex is calculated (S330).

A location value of the vertex of the terrain primitive is determined from the terrain feature point, and a type (see 100-1 or 100-2 of FIG. 3) of the terrain primitive is determined from information about the concave/convex structure of the terrain. Then, a region of the corresponding concave/convex terrain is set in consideration of a relationship with other concave-convex terrains (S340). A circular region having a longest radius without overlapping another concave/convex region may be set to the region of the corresponding concave/convex terrain.

Then, a magnitude value of the terrain primitive is decided based on the radius of the region of the concave/convex terrain (S350).

Then, gradient values of the medial axis of the terrain primitive are calculated according to a gradient difference in the left and right directions with the terrain feature point as the center (S360).

In more detail, rates of change in gradients based on altitude values in a radial shape with the terrain feature point as the center are calculated. Based on the rates of change in gradients, a direction in which a greatest difference between left-right gradients with the terrain feature point as the center appears is detected. If one side of a certain terrain has a gradual slope and the other side has a steep slope like a cliff, it can be determined that the medial axis of the corresponding terrain primitive has been tilted, and gradient values of the medial axis of the terrain primitive may be calculated based on a difference between the slopes.

A terrain having a corrected gradient of a medial axis may be expected to have a bell shape positioned vertically. By calculating rates of change in gradients based on altitude values in a radial shape with the vertex as the center, values of changes in gradients of the terrain primitive may be calculated (S370).

If creation of terrain primitives is completed, it is determined whether terrain primitives for all terrain regions have been created (S380). If it is determined that terrain primitives for all terrain regions have not yet been created, a next terrain region is selected (S311), and operations S320 to S370 are repeated.

Meanwhile, there may be terrain primitives that are positioned close to each other and arranged in a line. Such features may be found in a mountain chain or a river. The terrain primitives have homogeneity in a shape. In order to maximize the effect of homogeneity and improve convenience of terrain editing, the method of creating terrain primitives includes an operation of connecting a plurality of terrain primitives to each other. In order to connect a plurality of terrain primitives to each other, pointers of associated terrain primitives are set (S390), and terrain primitives that are to be connected to each other are determined based on the pointers of the terrain primitives.

In the embodiment of FIG. 6, operation S390 of creating terrain primitives connected to each other by setting pointers of associated terrain primitives is performed after terrain primitives for all terrain regions have been completely created.

However, operation S390 of creating terrain primitives connected to each other may be performed before terrain primitives for all terrain regions are created, as long as associated terrain primitives have been created.

The terrain representation method and the method of creating terrain primitives as described above with reference to FIGS. 5 and 6 can be implemented as computer-readable code in a computer-readable recording medium. The computer-readable recording medium includes all types of recording media in which computer-readable data is stored. Examples of the computer-readable recording medium include a ROM, a RAM, a CD-ROM, a DVD-ROM, a Blu-ray disc, a magnetic tape, a floppy disk, and an optical data storage. Further, the recording medium may be implemented in the form of carrier waves such as those used in Internet transmission.

In addition, the computer-readable recording medium may be distributed to computer systems over a network, in which computer-readable code may be stored and executed in a distributed manner. Furthermore, functional programs, codes, and code segments to implement the disclosed embodiments may be easily deduced by programmers skilled in the art thereof.

Figure 7:
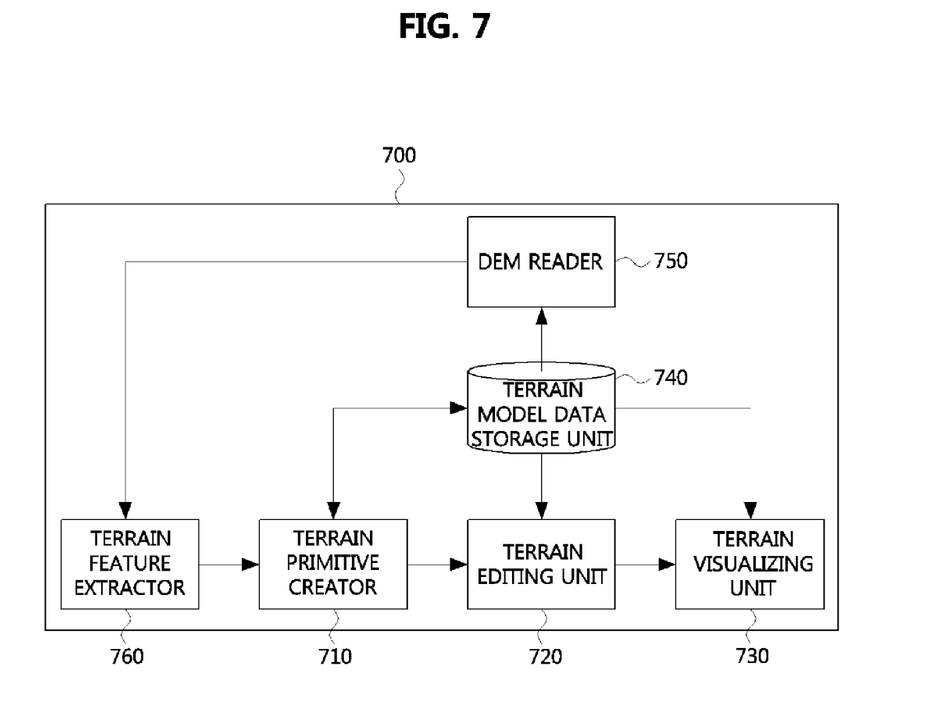
FIG. 7 is a block diagram illustrating a terrain representation apparatus according to an embodiment of the present invention.

FIG. 7 is a block diagram illustrating a terrain representation apparatus according to an embodiment of the present invention.

Components that will be described below are divided by functional classification not by physical classification, and may be defined by their functions.

The individual components may be implemented by hardware and/or program codes and processing units for performing their functions, and two or more of the components may be integrated into a component. Accordingly, in the following embodiment, names given to the components are not aimed at physically distinguishing the components, but at implying representative functions that are performed by the respective components. The technical concept of the present invention is not limited by the names of the components.

Referring to FIG. 7, a terrain representation apparatus 700 may include a terrain primitive creator 710, a terrain editing unit 720, a terrain visualizing unit 730, and a terrain model data storage unit 740, and may further include a DEM reader 750 and a terrain feature extractor 760.

The terrain primitive creator 710 creates a plurality of terrain primitives according to a concave/convex feature of a terrain extracted from DEM data of the terrain. The terrain primitive creator 710 may create the terrain primitives with the help of the DEM reader 750 and the terrain feature extractor 760.

The DEM reader 750 loads the DEM data of the terrain from the terrain model data storage unit 749, reads the loaded DEM data, and outputs the DEM data. The terrain feature extractor 760 receives the DEM data read by the DEM reader 750, and extracts feature information, for example, terrain feature points of the terrain. The extracted feature information of the terrain is used for the terrain primitive creator 710 to create terrain primitives.

Meanwhile, the DEM reader 750 and the terrain feature extractor 760 may be integrated into the terrain primitive creator 710, and implemented as a block.

The terrain primitive creator 710 may set pointers between vertices of two or more terrain primitives having similar features among the plurality of terrain primitives, and associate the two or more terrain primitives having the similar features based on the pointers, thereby creating associated terrain primitives.

The terrain editing unit 720 converts terrain primitive based terrain representation model data into DEM data and edits the DEM data.

The terrain visualizing unit 730 visualizes the edited DEM data output from the terrain editing unit 720.

The terrain model data storage unit 740 stores terrain representation model data based on DEM data of terrains and terrain primitive based terrain representation model data. The terrain model data storage unit 740 may be implemented in the form of database.

The database is not necessarily database in a strict sense, such as relational database or an objected-oriented database, but is a functional component that stores information. Accordingly, the database may be implemented in various types. For example, the database is a file-base type of information storage component.

According to the embodiments of the present invention as described above, it is possible to generate a high-quality terrain in a short production time, which may lead to activation of industries of producing movies, games, and educational content. Also, since the present invention can be applied to a navigation system, a mobile communication terminal, etc., which uses terrain production, application fields of the present invention are infinite.

Also, it is possible to significantly reduce a size of terrain data for visualizing a real terrain, which may help activate traffic- and national defense-related industries using real geographic data.

While the example embodiments of the present invention and their advantages have been described in detail, it should be understood that various changes, substitutions and alterations may be made herein without departing from the scope of the invention.

What is claimed is:

1. A terrain representation method representing the terrain through processing implemented by a processor and comprising:
    reading digital elevation model (DEM) data of a terrain using a hardware DEM reader;
    extracting feature points of the terrain from the DEM data using a hardware terrain feature extractor;
    creating terrain primitives according to the extracted feature points using a hardware terrain primitive creator;
    and generating terrain representation model data using a hardware terrain representation apparatus, based on the terrain primitives, as a DEM data, and visualizing the DEM data using a hardware terrain visualizing unit,
    wherein each terrain primitive is defined as a curved surface represented by a radial basis function whose vertex is a corresponding feature point, and is additionally defined by a terrain feature point corresponding to the vertex and connection information for connecting the corresponding feature point to another terrain feature point which is adjacent and connected to the corresponding terrain feature point, and wherein the calculating of each terrain primitive comprises calculating rates of change in height values of left and right grid points positioned in a normal direction to edges between terrain feature points adjacent and connected to one another.

2. The terrain representation method of claim 1, wherein the extracting of the feature points of the terrain from the DEM data comprises:
    extracting, from the DEM data, grid points whose height values are greater or smaller, by a predetermined threshold value or more, than height values of adjacent grid points in a predetermined distance range in left and right directions from an arbitrary grid point;
    connecting the extracted grid points to grid points immediately adjacent to the extracted grid points, thereby forming edges of a mesh to construct the mesh; and
    extracting at least one terrain feature point from ridge or valley terrain feature lines of the mesh.

3. The terrain representation method of claim 2, wherein the extracting of the at least one terrain feature point from the ridge or valley terrain feature lines of the mesh comprises calculating the ridge or valley terrain feature lines of the mesh according to a profile recognition and polygon breaking algorithm (PPA) or a polygon skeleton algorithm.

4. The terrain representation method of claim 1, wherein each terrain primitive is additionally defined by at least one of a gradient of a medial axis, a height, a diameter of a base, or a shape of the corresponding curved surface.

5. The terrain representation method of claim 4, wherein each terrain primitive has a concave or convex shape according to a ridge or valley feature of the corresponding terrain.

6. The terrain representation method of claim 1, wherein the creating of the terrain primitives according to the feature points comprises calculating each terrain primitive such that a difference between a height value of a grid point adjacent to each feature point and a height value of a curved surface of the corresponding terrain primitive is minimized.

7. The terrain representation method of claim 6, further comprising using the rates of change in the height values to minimize the difference between the height value of the adjacent grid point and the height value of the curved surface of the corresponding terrain primitive.

8. The terrain representation method of claim 1, wherein the generating of the terrain representation model data as DEM data, and the visualizing of the DEM data comprises,
    designating height values of the grid points, excluding the feature points of the terrain, based on maximum and minimum values among height values of grid points calculated based on terrain primitives including corresponding grid points, and thereby generating the terrain primitive based terrain representation model data as the DEM data.

9. The terrain representation method of claim 1, wherein the DEM data includes height coordinates that represent a height value of each grid point representing a terrain.

10. The terrain representation method of claim 1, wherein the feature points include at least one feature point representing a ridge or a valley.

11. A terrain representation apparatus comprising:
    a hardware digital elevation model (DEM) reader configured to read DEM data of a terrain;
    a hardware terrain feature extractor implemented by a processor and configured to extract feature points of the terrain from the DEM data, the feature points representing a ridge or a valley;
    a hardware terrain primitive creator implemented by the processor and configured to create a plurality of terrain primitives according to the feature points of the terrain;
    a hardware terrain editor implemented by the processor and configured to edit the terrain primitives; and
    a hardware terrain visualizer implemented by the processor and configured to generate the terrain model data based on terrain primitives as DEM data, and visualize the DEM data,
    wherein each terrain primitive is defined as a curved surface represented by a radial basis function whose vertex is a corresponding feature point, and is additionally defined by a terrain feature point corresponding to the vertex and connection information for connecting the corresponding feature point to another terrain feature point which is adjacent and connected to the corresponding terrain feature point, and wherein the calculating of each terrain primitive comprises calculating rates of change in height values of left and right grid points positioned in a normal direction to edges between terrain feature points adjacent and connected to one another.

12. The terrain representation apparatus of claim 11, wherein each terrain primitive is additionally defined by at least one of a gradient of a medial axis, a height, a diameter of a base, and a shape of the corresponding curved surface.

13. The terrain representation apparatus of claim 11, wherein each terrain primitive has a concave or convex shape according to a ridge or valley feature of the corresponding terrain.

14. A terrain representation method representing the terrain through processing implemented by a processor and comprising:
    reading digital elevation model (DEM) data of a terrain using a hardware DEM reader;
    extracting feature points of the terrain from the DEM data using a hardware terrain feature extractor;

creating terrain primitives according to the extracted feature points using a hardware terrain primitive creator; and generating terrain representation model data using a hardware terrain representation apparatus, based on the terrain primitives, as DEM data, and visualizing the DEM data using a hardware terrain visualizing unit, wherein the generating of the terrain representation model data, and the visualizing of the DEM data comprises designating height values of grid points, excluding the feature points of the terrain, based on maximum and minimum values among height values of grid points calculated based on terrain primitives including corresponding grid points, and thereby generating the terrain primitive based terrain representation model data as the DEM data.

* * * * *